US010766415B2

(12) United States Patent
Martin et al.

(10) Patent No.: US 10,766,415 B2
(45) Date of Patent: Sep. 8, 2020

(54) VEHICLE WHEEL TORQUE ADJUSTMENT

(71) Applicant: Ford Global Technologies, LLC, Dearborn, MI (US)

(72) Inventors: Douglas Raymond Martin, Canton, MI (US); Kenneth J. Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 15/945,847

(22) Filed: Apr. 5, 2018

(65) Prior Publication Data
US 2019/0308555 A1 Oct. 10, 2019

(51) Int. Cl.
*B60Q 9/00* (2006.01)
*B60K 28/02* (2006.01)

(52) U.S. Cl.
CPC .............. *B60Q 9/008* (2013.01); *B60K 28/02* (2013.01); *B60W 2520/10* (2013.01); *B60W 2540/00* (2013.01); *B60W 2552/40* (2020.02); *B60Y 2302/03* (2013.01); *B60Y 2400/902* (2013.01)

(58) Field of Classification Search
CPC ................................ B60K 28/02; B60Q 9/008
See application file for complete search history.

(56) References Cited

U.S. PATENT DOCUMENTS

| 8,581,714 | B2 | 11/2013 | Yu et al. | |
|---|---|---|---|---|
| 9,669,677 | B2 | 6/2017 | Hrovat et al. | |
| 9,783,169 | B2 | 10/2017 | Seiter et al. | |
| 9,827,904 | B2* | 11/2017 | Modarres | B60W 50/16 |
| 2004/0010371 | A1* | 1/2004 | Matsumoto | B60T 8/17557 701/300 |
| 2004/0252020 | A1* | 12/2004 | Matsumoto | B60T 8/17557 340/438 |
| 2005/0107931 | A1* | 5/2005 | Shimakage | B62D 15/025 701/41 |
| 2005/0236210 | A1* | 10/2005 | Kawazoe | B60Q 9/008 180/272 |
| 2006/0217861 | A1* | 9/2006 | Ihara | B62D 15/029 701/41 |
| 2008/0255729 | A1* | 10/2008 | Ichinose | B62D 15/025 701/42 |
| 2011/0231095 | A1* | 9/2011 | Nakada | B60W 30/12 701/301 |
| 2012/0293313 | A1* | 11/2012 | Yu | B60Q 9/008 340/435 |
| 2015/0039186 | A1* | 2/2015 | Okuda | B60W 50/14 701/41 |
| 2016/0001781 | A1* | 1/2016 | Fung | G16H 50/20 701/36 |
| 2016/0068103 | A1 | 3/2016 | McNew et al. | |
| 2017/0053513 | A1* | 2/2017 | Savolainen | B60K 28/02 |

(Continued)

FOREIGN PATENT DOCUMENTS

DE 102005009701 A1 9/2006

*Primary Examiner* — Ryan Rink
(74) *Attorney, Agent, or Firm* — Frank A. MacKenzie; Bejin Bieneman PLC

(57) ABSTRACT

A computer in a vehicle includes a processor programmed to apply, on the vehicle, upon detecting an occupant alertness level below a first threshold, a first periodic component to a first torque applied to one or more first-end wheels and a second periodic component to a second torque applied to one or more second-end wheels.

20 Claims, 6 Drawing Sheets

(56) References Cited

U.S. PATENT DOCUMENTS

| | | |
|---|---|---|
| 2017/0136842 A1 | 5/2017 | Anderson et al. |
| 2017/0166254 A1* | 6/2017 | Katoh ..................... B62D 6/00 |
| 2018/0201318 A1* | 7/2018 | Kataoka ............... B62D 15/025 |
| 2018/0265097 A1* | 9/2018 | Suzuki .................. B60W 50/14 |
| 2019/0193754 A1* | 6/2019 | Augst ................... B60W 50/16 |

* cited by examiner

VEHICLE WHEEL TORQUE ADJUSTMENT

BACKGROUND

Occupants of vehicles sometimes become tired or distracted and/or stop paying attention to driving. The occupants may not notice audible and visual outputs generated by the vehicle, or may ignore them. Haptic outputs can be effective to get the attention of occupants, but typically require the addition of mechanical devices such as vibrators or motors to create the haptic output.

DETAILED DESCRIPTION

Figure 1:
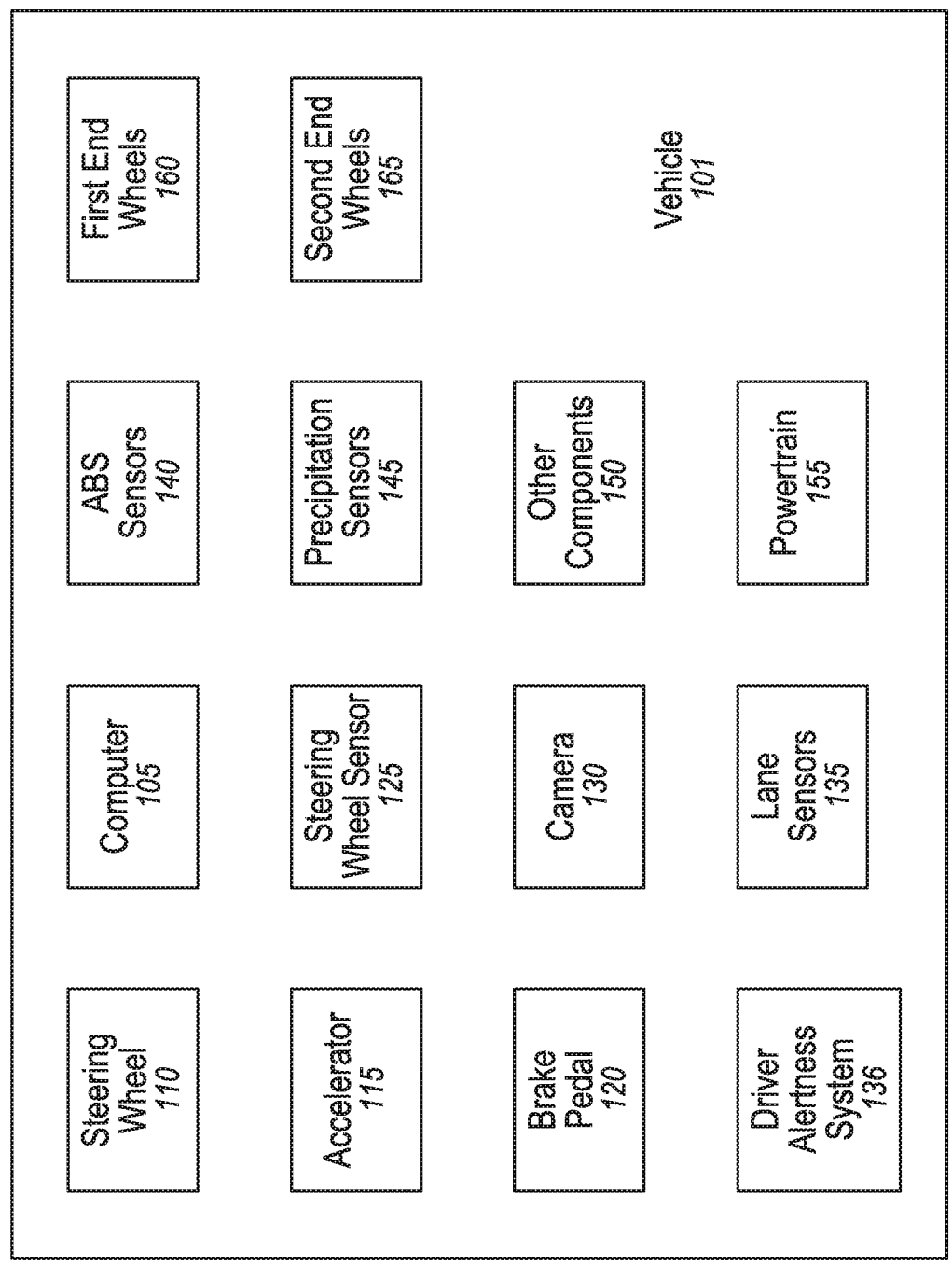
FIG. 1 is a block diagram of an example system for generating a vehicle wheel torque adjustment.

A computer in a vehicle includes a processor and a memory, the memory storing instructions executable by the processor such that the processor is programmed to, upon detecting an occupant alertness level below a first threshold, apply a first periodic component to a first torque applied to one or more first-end wheels on the vehicle and a second periodic component to a second torque applied to one or more second-end wheels on the vehicle.

The instructions to apply the second torque can further include programming to synchronize the first periodic component to the second periodic component. Further, synchronizing the first component to the second component can include programming to apply the second periodic component such that a second polarity of the second periodic component is opposite a first polarity of the first periodic component.

The instructions to apply the second periodic component can further include programming to establish a second magnitude of the second periodic component to be substantially equal to a first magnitude of the first periodic component.

The instructions can further include instructions to establish a magnitude of the first periodic component based on at least one of the occupant alertness level and a coefficient of static friction of a road on which the vehicle is travelling.

The instructions can further include instructions to establish a frequency of the first periodic component based on at least one of a speed of the vehicle; and a coefficient of static friction between the vehicle and a road on which the vehicle is travelling.

The first periodic component may be sinusoidal. Further, the first periodic component may be in a range between one cycle per second and 20 cycles per second.

The instructions to apply the first and second periodic components may include programming to apply the first and second periodic components for a first duration.

Further, the instructions may include instructions to, upon detecting, a first predetermined time after applying the first and second periodic components, a second occupant alertness level below the first threshold, apply a third periodic component to the first torque and a fourth periodic component to the second torque.

The instructions may further includes instructions to apply the third periodic component such that a third magnitude of the third periodic component is greater than a first magnitude the first periodic component based on applying the third periodic component within a second predetermined time after applying the first periodic component.

A system includes occupant alertness capturing means, first torque generating means, second torque generating means, and a computer in a vehicle. The computer includes a processor and a memory, the memory storing instructions executable by the processor such that the processor is programmed to receive, from the occupant alertness capturing means, occupant alertness data. The processor is further programmed to, upon detecting, based on the occupant alertness data, an occupant alertness level below a first threshold, send a first instruction to the first torque generating means to apply a first periodic component to a first torque applied to one or more first-end wheels on the vehicle; and a second instruction to the second torque generating means to apply a second periodic component to a second torque applied to one or more second-end wheels on the vehicle.

The instruction to apply the second periodic component can further include instructions to send instructions to the first torque generating means and the second torque generating means to synchronize the first periodic component with the second periodic component. The instructions to synchronize the first periodic component and second periodic component can further include programming to send instructions to the first torque generating means and the second torque generating means to apply the second periodic component with a second polarity of the second periodic component that is opposite a first polarity of the first periodic component.

The instruction to apply the second periodic component can further include programming to send instructions to the first torque generating means and the second torque generating means to establish a first magnitude of the first periodic component to be substantially equal to a second magnitude of the second periodic component.

The instructions can further include instructions to establish a magnitude of the first periodic component based on at least one of the occupant alertness level; and a coefficient of static friction of a road on which the vehicle is travelling.

A method includes, upon detecting an occupant alertness level below a first threshold, applying a first periodic component to first torque applied to one or more first-end wheels on a vehicle; and applying a second periodic component to a second torque applied to one or more second-end wheels on the vehicle.

The method can further include applying the second periodic component to the second torque includes synchronizing the second periodic component with the first periodic component, such that a second polarity of the second periodic component is opposite a first polarity of the first periodic component.

Applying the second periodic component can further include establishing a second magnitude of the second periodic component to be substantially equal to a first magnitude of the first periodic component.

The method can further include establishing a magnitude of the first periodic component based on at least one of the occupant alertness level, and a coefficient of static friction of a road on which the vehicle is travelling.

FIG. 1 illustrates an example system 100 for controlling wheel torque for a vehicle 101 in response to sensor data relating to an occupant condition. An occupant is a person in the vehicle 101, and may be an operator of the vehicle 101. The vehicle 101 includes a computer 105. The computer 105 is programmed to collect data from sensors that can be used to determine the occupant condition, including determining a level of alertness or capability to operate the vehicle 101. This data can come from one or more types of sensors, and can be referred to collectively herein as occupant alertness data. A non-limiting list of sensors for determining occupant alertness includes a steering wheel sensor 125, a camera 130, and a lane sensor 135. The computer 105 may be further programmed to use other sensors to collect data indicating an alertness level of the occupant. As described in additional detail below, the computer 105 determines an occupant alertness level based on the occupant alertness data.

The computer 105 also collects operating condition data from sensors such as antilock brake (ABS) sensors 140 and precipitation sensors 145. Operating condition data is data specifying conditions under which the vehicle 101 is operating such as ambient temperature, humidity, road friction, speed of the vehicle, vehicle motor speed, etc. Based on the operating condition data, the computer 105 may be programmed to determine a coefficient of static friction (COSF) for the road on which the vehicle 101 is travelling. The computer 105 may further be programmed to identify, for example, precipitation in the environment.

Based on the occupant alertness data, and further based on the operating condition data, the computer 105 is programmed to generate a haptic output by controlling vehicle wheel torque. The haptic output can include a torque including a periodic component applied to first-end wheels 160 and/or second-end wheels 165 of the vehicle 101. First-end wheels 160 can be front wheels for a vehicle 101 including front-wheel drive or four-wheel drive, and rear wheels for a vehicle 101 including rear-wheel drive. Second-end wheels 165 can be rear wheels for a vehicle 101 including four-wheel drive. The computer 105 is programmed to apply a periodic component to a non-periodic component for driving the first-end wheels 160 and when available, the second-end wheels 165.

The computer 105 can be programmed to establish a magnitude and frequency of the periodic component based on factors that can include the occupant alertness level, the number of outputs that have been given in a current output sequence, and operating conditions such as vehicle speed, the coefficient of static friction (COSF) between the road and the vehicle 101, whether it is precipitating, the ambient temperature, etc.

An occupant may control the vehicle 101. Additionally or alternatively, the computer 105 may control some or all of the operations of the vehicle 101.

For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The vehicle 101 includes one or more of a steering wheel 110, accelerator (gas pedal) 115 and a brake pedal 120. The computer 105 is programmed to receive occupant input from one or more of the steering wheel 110, accelerator 115 and brake pedal 120. Based on the occupant input, the computer 105 is programmed to apply a torque to the first-end wheels 160, and when available, the second-end wheels 165. For the purposes of this disclosure, applying a torque means to send instructions to a powertrain 155 in the vehicle 101 to generate and apply the torque.

In the case the first-end wheels 160 includes a right and a left wheel, applying a torque to the first-end wheels 160 can mean applying a first portion of the torque to a right first-end wheel 160 and a second portion of the torque to a left first-end wheel 160. Typically, the torque may be evenly divided between the right and left first-end wheels 160. In the case that there is only one first-end wheel 160, the entire torque may be applied to the one first-end wheel 160.

Similarly, applying a torque to the second-end wheels 165 can mean applying a first portion of the torque to a right second-end wheel 165 and a second portion of the torque to a left second-end wheel 165. In this case, the torque may be evening divided between the right and left second-end wheels 165. In the case that there is only one second-end wheel, the entire torque may be applied to the one second-end wheel 165.

In addition to controlling the powertrain 155 and the first and second-end wheels 160, 165, the computer 105 controls other components 150 of the vehicle 101. The other components 150 may include brakes, a steering rack, seats, climate control, lighting, displays, speakers, etc., in the vehicle 101. Each of the other components 150 may include a computer, e.g., an electronic control unit (ECU) or the like, programmed to receive instructions from the computer 105, and actuate one or more actuators in the component 150. For example, the other component 150 may be a display. A computer in the display may receive an instruction from the computer 105 to display a message on the display. The computer may then actuate one or more actuators (e.g., transistors) to display the message on the display.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc. Additionally or alternatively, in cases where the computer 105 actually comprises multiple devices, the vehicle network may be used for communications between devices represented as the computer 105 in this disclosure. In addition, the computer 105 may be programmed for communicating with a network which may include various wired and/or wireless networking technologies, e.g., cellular, Bluetooth®, Bluetooth® Low Energy (BLE), wired and/or wireless packet networks, etc.

A steering wheel sensor 125 is a sensor such as is known arranged to collect and provide steering data including, for example, data specifying a steering wheel angle as it changes over time, thus providing data concerning steering actions applied by the occupant to the steering wheel sensor 125 and provide the steering data to an occupant alertness system 136. The steering wheel sensor(s) may include one or more of accelerometers, gyroscopes, torque measurement sensors, etc., that are coupled to and sense movement of the steering wheel 110 or a steering torque applied to the steering wheel 110.

The camera(s) 130 may be one or more cameras on the vehicle 101, arranged to collect occupant movement data of the occupant of the vehicle 101 and provide the occupant movement data to an occupant alertness system 136. For example, the camera 130 may be mounted in an interior of the vehicle 101, with a field of vision directed toward a face of the occupant. The camera 130 collects occupant movement data such as is known, e.g., a frequency of eyelid movements (e.g., blinks), a magnitude and frequency of iris movements, a direction of the iris relative to a front end of the vehicle 101, etc., and provides the occupant movement data to the occupant alertness system 136.

The lane sensors 135 may be cameras or lidar units arranged on an exterior of the vehicle 101 such as are known to collect lane departure data indicating a position of the vehicle 101 relative to an edge of a lane in which the vehicle 101 is travelling. The lane sensors 135 provide the lane departure data to the occupant alertness system 136. The lane departure data may include, for example, image data of the lane in which the vehicle is travelling, with which the occupant alertness system 136 can determine a distance of the vehicle 101 from the edge of the lane.

The occupant alertness system 136 may include monitoring of one or more of lane-keeping or departures, steering data, eyelid movements, iris movements, etc., as are known. An example of a lane departure system is the Ford® Driver Alert System as currently deployed in the 2018 Expedition®. An example of a steering wheel monitoring system is the Driver Alert System from Volkswagen® that monitors steering wheel movements. An example of a method for monitoring eye movements is disclosed in the article "*Eye behavior based drowsiness Detection System*," published in Wavelet Active Media Technology and Information Processing (ICCWAMTIP), 2015 12$^{th}$ International Computer Conference, 18-20 Dec. 2015, Javed Ahmed, et. al., Electronic ISBN: 978-1-4673-8266-3, Publisher: IEEE. Such systems typically provide data which the occupant alertness system 136 can utilize to determine an occupant alertness level.

The occupant alertness system 136 may further include programming to receive an output from the steering wheel sensors 125, cameras 130 and/or lane sensors 135, and determine, based on the output, an occupant alertness level. For purposes of this disclosure, the occupant alertness level is a numeric value indicating a degree to which an occupant is paying attention to and responding to operating conditions for the vehicle 101. For example, the occupant alertness level may be determined on a scale from one to six, with one being the lowest occupant alertness level and six being the highest occupant alertness level.

The occupant alertness system 136 is programmed to receive one or more of the steering data, the occupant movement data and the lane departure data, and to determine the alertness level of the occupant based on the received data. The steering data, the occupant movement data, and the lane departure data is collectively referred to herein as occupant alertness data.

For one or more of the steering data, the occupant movement data, and the lane departure data, the occupant alertness system 136 may receive, determine, and/or be preprogrammed with (i.e., store in a memory) one or more thresholds. The occupant alertness system 136 may compare the occupant alertness data to the one or more thresholds to determine the occupant alertness level based on the data. This is shown in table 1 below.

TABLE 1

| Occupant Alertness Level | |
|---|---|
| 6 | alertness above first threshold |
| 5 | first threshold > alertness > second threshold |
| 4 | second threshold > alertness > third threshold |
| 3 | third threshold > alertness > fourth threshold |
| 2 | fourth threshold > alertness > fifth threshold |
| 1 | Alertness below fifth threshold |

For each of the steering data, the occupant movement data and the lane departure data, five thresholds may be determined. The alertness level thresholds are determined by observing the nature of movements (eye and steering) in each level of incapacitation. For example, in the case of monitoring eye movements, the first threshold (transitioning from alertness level 6 to alertness level 5) may be looking down for two seconds. For the fifth threshold (alertness level 1), incapacity to continue the trip may be indicated by lack of response to the first four levels of warning and/or closed eyes for five seconds. Each of the thresholds one through five indicate a decreasing level of alertness of the occupant.

As another example, in the case of monitoring steering corrections, the first threshold may be a lack of steering correction for two seconds. For the fifth threshold, incapacity to continue the trip may be indicated by a lack of response to the first four levels of warning and/or a lack of steering correction for five seconds. These thresholds may be determined empirically based on, for example, studies of the general population, that correlate levels of alertness with occupant alertness data such as frequency and/or magnitude of steering corrections, frequency of eyelid movements, iris movements, distance of the vehicle to an edge of the lane in which the vehicle is travelling, etc.

The occupant alertness system 136 may include additional programming based on a type of occupant alertness data utilized. For example, when using lane departure data, to prevent false outputs when the occupant is intending to change lanes, the occupant alertness output may be turned off when the occupant has activated a vehicle's turn signal.

Using six thresholds is only an example. For each of the steering data, the occupant movement data, and the lane departure data, the occupant alertness system 136 may use any number (one or more) thresholds.

The computer 105 may additionally collect data related to operating conditions of the vehicle 101. When, the computer 105 determines, based on the occupant alertness level, to generate an output including a periodic torque component, the computer 105 may determine a magnitude or frequency of the periodic torque component based on the operating conditions data.

For example, the vehicle 101 may include one or more antilock braking system (ABS) sensors 140. The ABS sensors 140 may include, for example, torque sensors coupled to the first and second-end wheels 160, 165. The computer 105 may collect ABS data from the ABS sensors 140 to determine or estimate a coefficient of static friction (COSF)

between the road on which the vehicle 101 is travelling and the vehicle wheels. For example, the ABS sensors 140 may detect microslips, i.e., slips of a short duration (on the order of milliseconds) of first-end wheels 160 or second-end wheels 165 when an applied torque to the respective first-end or second-end wheels 160, 165 is changed. Based on the change of the applied torque and the detected slip, the computer 105 can estimate the coefficient of static friction (COSF) for the first-end or second-end wheel 160, 165.

The vehicle 101 may further include one or more precipitation sensors 145. The one or more precipitation sensors 145 may be located, for example, on a windshield of the vehicle 101 and may detect rain drops or snow on the windshield. The computer 105 may collect data from the precipitation sensors 145 and determine whether it is precipitating.

The computer 105 is programmed to generate outputs in the case that the alertness level drops below a first or output threshold. The computer 105 may be further programmed to adjust the output level based on conditions such as, the occupant alertness level and a number of preceding outputs within a sequence of outputs. The output level may be a numeric value, for example, on a scale of one to five, corresponding to an intensity of an output signal for alerting the occupant, with one being the lowest output level and five being the highest output level. The computer 105 may, depending on the output level, generate various output signals including periodic torque signals (periodic torque components) superimposed on torques for driving the first-end and second-end wheels 160, 165, based on the output level. A sequence of outputs may be one or more outputs, with each output except a first output in the sequence occurring within a predetermined time of the previous output.

For example, in a case when the computer 105 generates the first output, and determines, a predetermined time following the first output, that the occupant alertness level remains below the output threshold, the computer 105 may generate a second output. The output level of the second output may be adjusted based on having one preceding output (the first output) in the sequence of outputs. For example, the computer 105 may be programmed to assign a higher output level to the second output relative to the first output, although the occupant alertness level remains unchanged.

Figure 2:
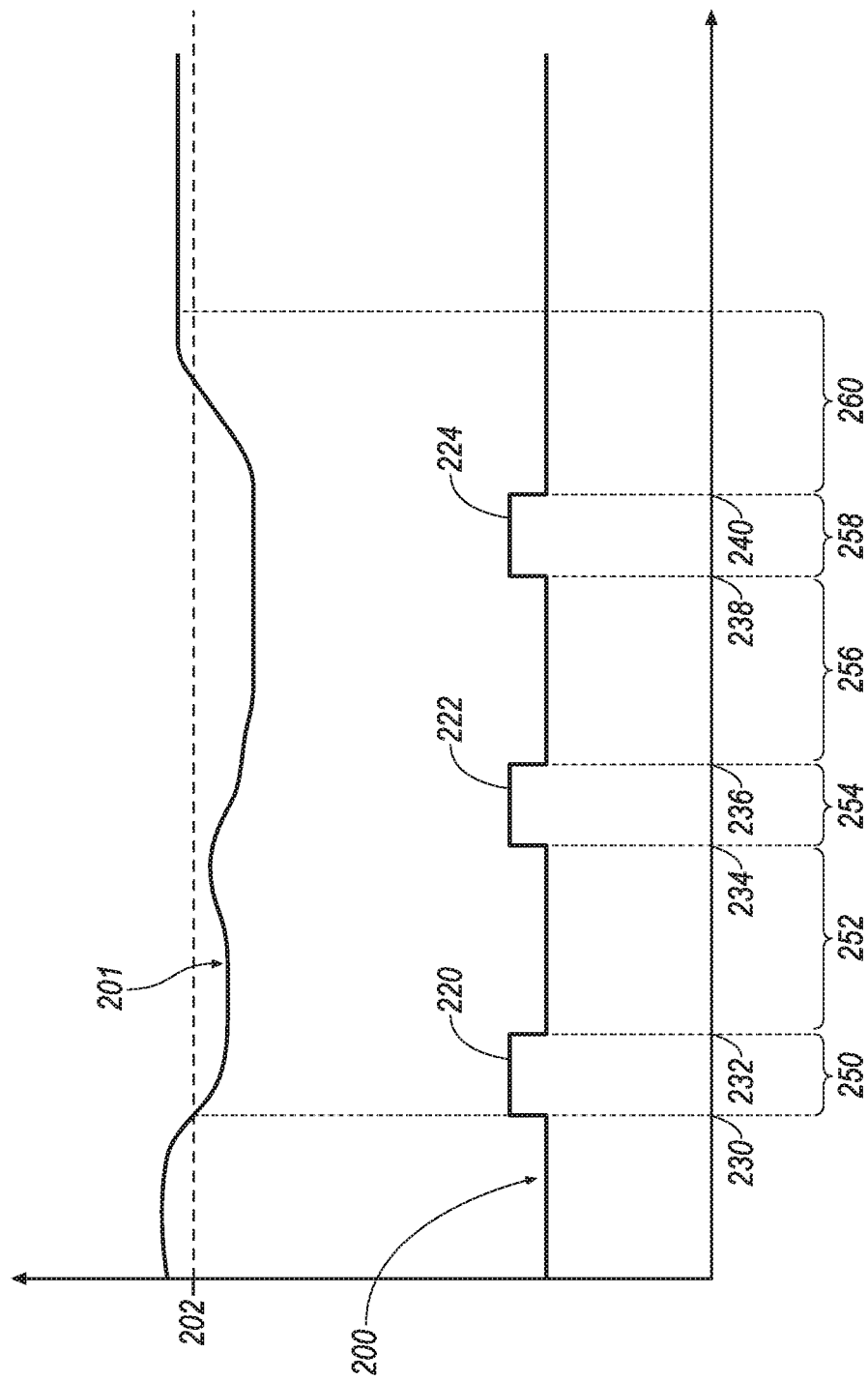
FIG. 2 is a diagram of an example vehicle torque control sequence.

FIG. 2 illustrates an example output sequence 200 based on an occupant alertness level 201. The occupant alertness level 201 drops below a first threshold 202 (the output threshold) at a first time 230. The computer 105 is programmed, based on the occupant alertness level 201 dropping below the first threshold 202, to generate a first output 220. The first output 220 continues until a second time 232 and has a first duration 250.

After a first predetermined time 252, the computer 105 determines that the occupant alertness level 201 remains below the first threshold 202 and generates a second output 222 in the output sequence 200 The second output begins at a third time 234 and ends at a fourth time 236 and has a second duration 254.

After a second predetermined time 256, the computer 105 determines that the occupant alertness level 201 remains below the first threshold 202, and generates a third output 224. The third output 224 begins at a fifth time 238 and ends at a sixth time 240 and has a third duration 258.

After a third predetermined time 260, the computer 105 determines that the occupant alertness level is higher than the first threshold 202, and discontinues the output sequence.

The output sequence, as shown in FIG. 2, is only an example. The output sequence may have one or more outputs.

The first, second and third durations 250, 254, 258 may be a predetermined duration, received by or programmed in the computer 105, such as three seconds. The predetermined duration may be a reasonable duration for an output used to increase the alertness level of the occupant. The first, second and third durations 250, 254, 258 may be, but are not necessarily, the same.

The first, second and third predetermined times 252, 256, 260, may be a predetermined time, received by or programmed in the computer 105, such as 15 seconds. The predetermined time may be a reasonable time after an output to generate a following output. The first, second, and third predetermined times may be, but are not necessarily, the same.

The computer 105 is programmed to assign an output level to each output. The output level is a degree to which the output is intended to get the attention of the occupant. For example, a output level of one indicating a lowest output level, and may be a chime sound, selected to be pleasant sounding, together with a message on a display indicating that the occupant needs to pay more attention to driving.

A output with a output level of two, which is the second lowest output level, may include a haptic output with a magnitude and frequency selected to provide a gentle output to the occupant. As described in additional detail below, the computer 105 may generate the haptic output by applying a torque with a periodic component to first-end wheels 160 and, when applicable, second-end wheels 165.

As the output level increases, the magnitude and/or the frequency of the haptic output may be adjusted to be increasingly disruptive to the occupant. As described below, increasing the magnitude of the periodic component or decreasing the frequency of the periodic component may increase the "disruptiveness" of the output to the occupant.

The computer 105 may be programmed to determine the output level based on the occupant alertness level and the previous number of outputs within the output sequence. Table 2 below illustrates an example of selecting the output level.

TABLE 2

| Output level | Occupant Alertness level | Previous number of outputs |
|---|---|---|
| 1 | 5 | 0 |
| 2 | 5 | 1 |
| 2 | 4 | 0 |
| 3 | 5 | 2 |
| 3 | 4 | 1 |
| 3 | 3 | 0 |
| 4 | 5 | 3 |
| 4 | 4 | 2 |
| 4 | 3 | 1 |
| 4 | 2 | 0 |
| 5 | 5 | 4 |
| 5 | 4 | 3 |
| 5 | 3 | 2 |
| 5 | 2 | 1 |
| 5 | 1 | 0 |

Figure 3:
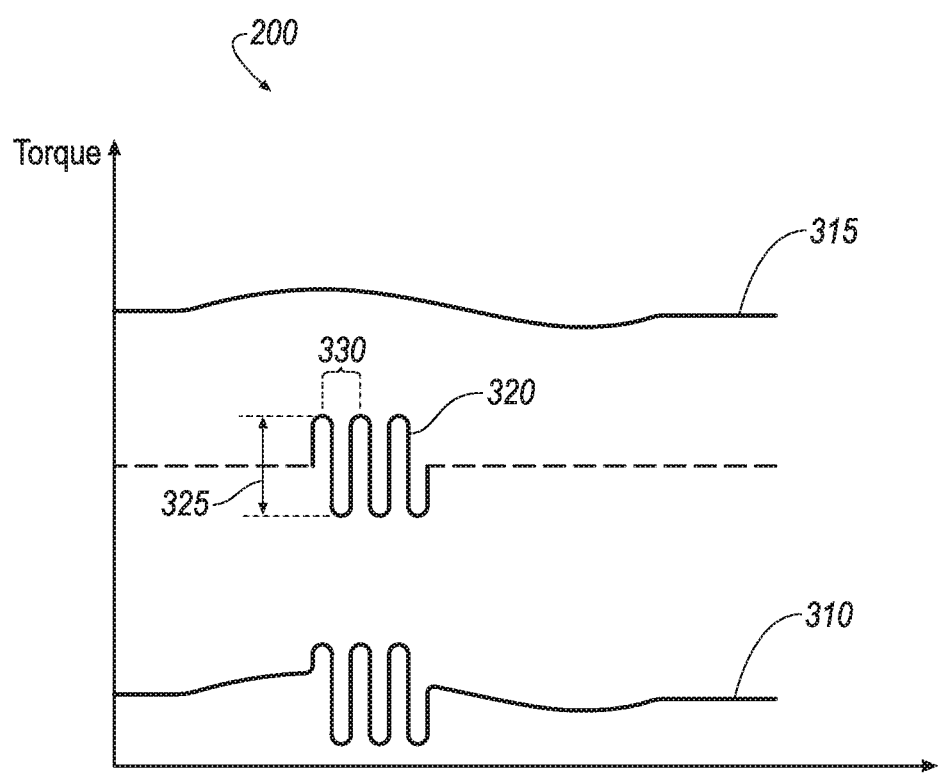
FIG. 3 is a diagram of an example torque applied to one or more wheels of a vehicle including a non-periodic component and a periodic component.

FIG. 3 illustrates an exemplary torque 310 that includes a non-periodic component 315 and a periodic component 320. The non-periodic component 315 is the portion of the torque 310 that the computer 105 (via the powertrain 155) is applying to the first-end wheels 160 to propel the vehicle 101. The computer 105 may determine the non-periodic component 315 based, at least in part, on user input from the accelerator 115. Additionally or alternatively, the computer 105 may determine the non-periodic component 315 based, in full or in part on semi-autonomous or autonomous vehicle control systems such as cruise control.

In a case that the computer 105 determines, based on the occupant alertness level and the previous number of outputs within the output sequence, to generate a haptic output, the computer 105 may, via the powertrain 155, generate the periodic component 320 for the torque 310. The periodic component is referred to as "periodic" because a magnitude of the periodic component varies in time with a frequency. The periodic component 320 may have a magnitude 325 and a period 330. The periodic component may be applied as a sine wave, or another periodic function. The periodic component 320 has a frequency as follows: $f=1/p$, where p represents the period 330. The magnitude of the periodic component 320 is the peak-to-peak torque value of the periodic component 320 measured in units of Newton meters. The frequency is the number of cycles per second of the periodic component 320. As described below, the frequency may be established based on occupant alertness level, operating conditions of the vehicle 101, and/or a number of preceding outputs in an output sequence.

To generate the haptic output, the computer 105 may, via the powertrain 155, superimpose the periodic component 320 on the non-periodic component 315 to generate the torque 310.

The computer 105 is programmed to calculate the magnitude 325 of the periodic component 320 to be applied. In one case, the magnitude 325 may be calculated based on a maximum magnitude and an output level of the output. The maximum magnitude may be empirically determined as, for example, a value that is disruptive to an occupant, but has a low likelihood of causing the occupant to lose control of the vehicle 101. For example, the maximum magnitude may be empirically determined to be a value such as 50 Newton meters (Nm).

Additionally or alternatively, the maximum magnitude may be determined based on the coefficient of static friction between the road and the wheels, and/or a change in torque that causes a wheel to slip. The antilock braking system (ABS) may monitor the coefficient of static friction during driving as described above. The coefficient of static friction is, generally, a dimensionless ratio between a force pressing two objects together and the force of friction between them. In the case of the vehicle 101, it is the ratio of the force pressing the vehicle 101 toward the road which is supporting the vehicle 101. For rubber on a concrete road, the coefficient of static friction typically varies between a range of 0.3 for wet roads to one for dry roads. In the case that the coefficient of static friction is at or near a reference value for rubber tires on a dry road (e.g., one), the computer 105 may set the maximum magnitude for the first periodic component to equal a reference magnitude value such as 50 Nm. In a case that, due, for example, to slippery conditions, the coefficient of static friction is reduced, the computer 105 may reduce the maximum magnitude proportionally. That is, the computer 105 may calculate $$mag_{max}=(COSF/COSF_{dry})(mag_{ref}) \quad \text{Eqn. 1}$$

where:
$mag_{max}$ is the maximum magnitude used for determining the magnitude of the periodic component,
COSF is the coefficient of static friction as measured by the antilock braking system,
$COSF_{dry}$ is the reference value of the coefficient of static friction for a rubber tire on a dry road, and
$mag_{ref}$ is the reference magnitude for a rubber tire on a dry road.

In a case where the reference magnitude $mag_{ref}$ is 50 Nm, the reference value $COSF_{dry}$ on dry roads is 1.0, the coefficient of static friction COSF is 0.40, the maximum magnitude $mag_{max}=0.40/1*50$ Nm=20 Nm.

A proportional relationship between the maximum magnitude of the periodic component and the coefficient of static friction is only an example. Other relationships may be established. For example, the computer 105 may include a table that includes a percentage of the reference magnitude $mag_{ref}$ to be used for the maximum magnitude $mag_{max}$ as a function of different coefficients of static friction.

After the maximum magnitude of the periodic component is established, the computer 105 may establish the magnitude 325 of the periodic component to be a percentage of the maximum magnitude $mag_{max}$ based on the output level. For example, the computer 105 may set the magnitude 325 according to the following table.

TABLE 3

| Output level | Percentage of maximum magnitude $mag_{max}$ |
| --- | --- |
| 1 | 0 |
| 2 | 40 |
| 3 | 70 |
| 4 | 100 |
| 5 | 100 |

The computer 105 is further programmed to establish a frequency for the periodic component 320. Typically, the frequency of the periodic component is within a range of zero cycles per second to 20 cycles per second. For example, the frequency of the periodic component 320 may be a base frequency such as 10 cycles per second. This base frequency may be determined empirically, as a frequency that is disruptive to the occupant, but sufficiently far away from any resonant frequency of the vehicle 101, to avoid reducing control of the vehicle 101 by the occupant.

In an example, the computer 105 may be programmed to establish the frequency of the periodic component 320 based on the presence of precipitation. A periodic component 320 with a higher frequency is less likely to reduce control of the vehicle 101 by the occupant. The computer 105 may be programmed, for example, upon receiving data indicating that it is precipitating, to set the frequency of the periodic component 320 to be a factor x* the base frequency. As an example, x may be set to x=2. The factor x may be determined empirically as a value that continues to send a disruptive signal to the occupant while also accounting for the effect of wet roads on controlling the vehicle 101.

As another example, the computer 105 may be programmed to establish the frequency of the periodic component based on vehicle speed. For example, when the vehicle speed is below a threshold speed, the computer 105 may be programmed to establish the frequency of the periodic component 320 to be the base frequency. When the vehicle speed is equal to or above the threshold speed, the computer 105 may be programmed to establish the frequency of the periodic component to be a factor x* the base frequency. For example, x may be set to x=2.

Figure 4:
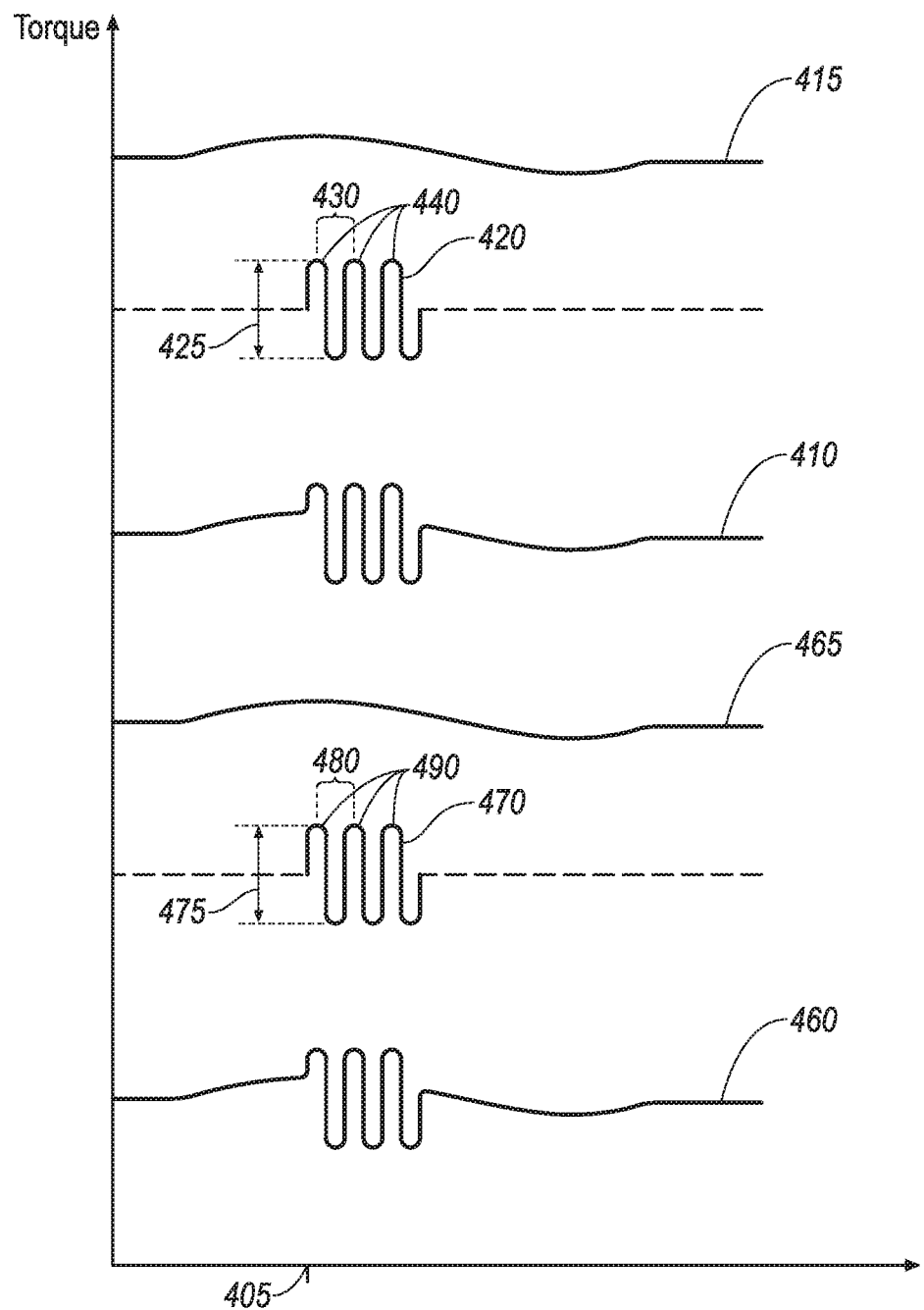
FIG. 4 is an example of a first torque applied to one or more first-end wheels and a second torque applied to one or more second-end wheels of a vehicle.

In a case that the vehicle 101 includes four-wheel drive the computer 105 may be programmed to generate a first torque 410 for first-end wheels 160 and a second torque 460 for the second-end wheels 165, as illustrated in FIG. 4. The first torque 410 includes a non-periodic component 415 and a periodic component 420. The second torque 460 includes a second non-periodic component 465 and a second periodic component 470.

In an example, the first and second periodic components 420, 470 may by synchronized. That is, they may both start at a time to and have a same frequency=1/period 430=1/period 480. They may also have a same polarity. That is, positive peaks 440 for the first periodic component 420 may occur at a same time as positive peaks 490 for the second periodic component 470.

In the case as illustrated in FIG. 4, the maximum torque, as calculated above, may be split between the first-end wheels 160 and the second-end wheels 165. It may be split evenly, that is, 50% of the magnitude may be applied to the first-end wheels 160 and 50% of the magnitude may be applied to the second-end wheels 165. Alternatively, any other split may be used, such as 60/40, 10/90, etc.

Figure 5:
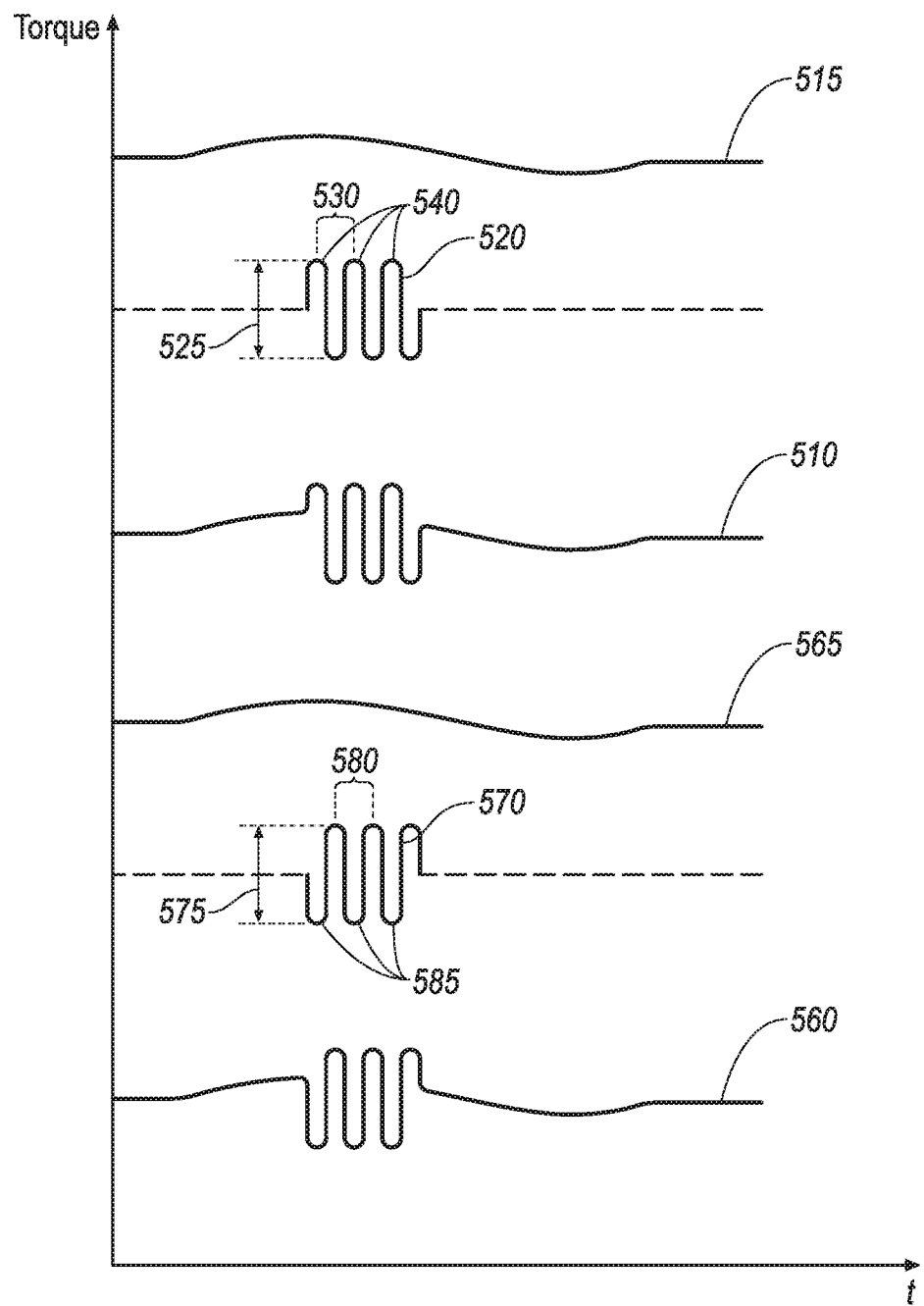
FIG. 5 is another example of a first torque applied to one or more first-end wheels and a second torque applied to one or more second-end wheels.

In another case that the vehicle 101 includes four-wheel drive, as illustrated in FIG. 5, the computer 105 may be programmed to apply first and second torques 510, 560 to the first and second-end wheels 160, 165. In this case, the polarity of the first periodic component 520 of the first torque 510 is opposite in polarity to the second periodic component 570 of the second torque 560. That is, the peaks 540 of the first periodic component 515 occur at a same time as the valleys 585 of the second periodic component 570. In an example as shown in FIG. 5, the first magnitude 525 of the first periodic component is equal to the magnitude 575 of the second periodic component 570. The magnitude may be calculated, for example, as discussed in reference to the periodic component 320 above.

The examples above are not intended to be limiting. The computer 105 may be programmed to generate a variety of different torque patterns to create a haptic output. For example, the periodic torque component may have a magnitude that varies over time. It may, for example, start at a low level, and increase over time to a higher level, or start at a low level, increase to a higher level, and then return to a lower level.

As another example, the periodic torque component may have a frequency that varies over time. For example, the periodic component may start at a first low frequency, and increase over time to a second higher frequency. In one example, the periodic component could start at ten cycles per second, and increase over a length of the output to 20 cycles per second. Similarly, the frequency could start at a higher frequency (e.g., 20 cycles per second) and decrease to lower frequency such as ten cycles per second.

As another example, additionally or alternatively to adding a periodic component, the computer 105 may be programmed to add a supplemental haptic component that is not periodic. For example, in a case that the vehicle 101 is a four-wheel drive vehicle, the computer 105 may be programmed to apply a first supplemental haptic component to the first-end wheels 160, and a second supplemental haptic component to the second-end wheels 165. The second supplemental haptic component may be equal to and opposite the first supplemental haptic component, such that the net torque applied to vehicle (i.e., the sum of the first supplemental haptic component and the second supplemental haptic component) is zero at any time.

As yet another example, the computer 105 may be programmed to cause a wheel torque to oscillate left to right. For example, a first periodic torque component with a first polarity may be applied to the left first-end wheel 160 and a second periodic torque component with a second, opposite polarity may be applied to the right first-end wheel 160. In this example, in the case of a four-wheel drive vehicle 101, for example, a third periodic torque component may be applied to the left second-end wheel 165 having the second, opposite polarity, and a fourth periodic torque component may be applied to the right second-end wheel 165 having the first polarity.

In this example, the computer 105 may further be programmed to switch the polarities between the left and right first-end wheels 160, and further to switch the polarities between the left and right second-end wheels 165 after a predetermined time, for example after one second.

Figure 6:
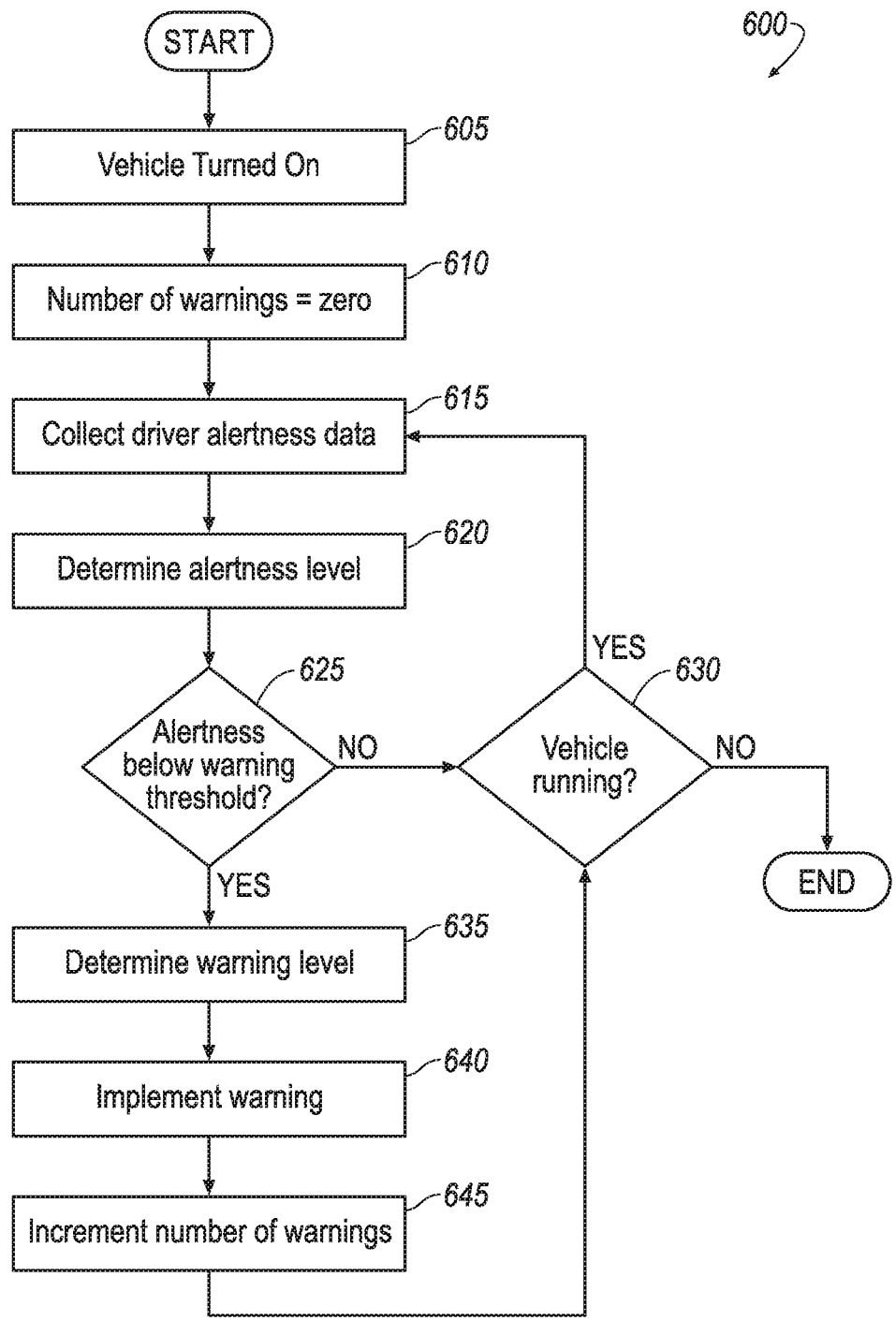
FIG. 6 is a diagram of an example process for applying a torque to wheels of a vehicle including a periodic component.

FIG. 6 is a diagram of an example process 600 for implementing an output sequence including applying torques to vehicle wheels. The process 600 begins in a block 605.

In the block 605, the vehicle 101 is turned on. The computer 105 recognizes that the vehicle 101 is turned on, for example, by detecting a signal from the vehicle 101 ignition. Upon recognizing that the vehicle 101 is turned on, the process 600 continues in a block 610.

In the block 610, the computer 105 initializes a variable "n" to a value zero. The variable "n" tracks a number of outputs that have been generated within the output sequence.

Next, in a block 615, the computer 105 collects occupant alertness data. As described above, the occupant alertness data may include one or more of steering data, occupant movement data, and lane departure data.

Next, in a block 620, the computer 105 determines an occupant alertness level based on the occupant alertness data. As described above, the computer 105 receives the one or more of steering data, occupant movement data and lane departure data. Based on the one or more of steering data, occupant movement data and lane departure data, the computer 105 determines the occupant alertness level. The occupant alertness level may be, for example, a numeric value between one and six, with six being the highest alertness level and one being the lowest alertness level. The process 600 then continues in a block 625.

In the block 625, the computer 105 determines if the occupant alertness level is below an output threshold. The output threshold may be, for example, a first threshold below which a classification of the occupant alertness level changes from level six to level five. In the case that the computer 105 determines that the occupant alertness level is greater than or equal to the output threshold level, the process 600 continues in a block 630. In the case that the occupant alertness level is below the output threshold, the process 600 continues in a block 635.

In the block 630, the computer 105 determines whether the vehicle 101 is running. For example, the computer 105 may receive data from the ignition indicating that the ignition remains in an "on" position, or detect that a motor in the vehicle is running. In the case that the vehicle is running, the process 600 continues in the block 615. In the case that the vehicle 101 is not running, the process 600 ends.

In the block 635, the process 600 determines an output level. As shown in table 2 above, the output level may be a level between one and five, with output level one being the lowest output level and output level five being the highest output level. The output level may be determined based on the occupant alertness level and further based on the number "n" of previous outputs that have been implemented in the output sequence.

Next, in the block 640, the computer 105 implements an output based on the output level. The outputs may include audio, visual, and haptic messages to the occupant. The outputs may further include controlling one or more of the propulsion, braking and steering of the vehicle 101. Table 4 indicates one set of outputs that may be implemented based on output level.

TABLE 4

| Output level | Chime | Audio message (Pay Attention!) | Visual message (Pay Attention!) | Haptic signal | Vehicle control (if available) |
|---|---|---|---|---|---|
| 1 | Yes | Yes | Yes | No | No |
| 2 | No | Yes | Yes | Magnitude = 40% of maximum, Frequency = 2*base frequency | No |
| 3 | No | Yes | Yes | Magnitude = 70% of maximum, Frequency = base frequency | No |
| 4 | No | Yes | Yes | Magnitude = 100% of maximum, frequency = base frequency | Maintain vehicle at lowest legal speed |
| 5 | No | Yes | Yes | Magnitude = 100% of maximum, frequency = base frequency | Drive vehicle to safe parking area and park vehicle. |

The outputs for each of the output levels, as indicated in Table 4 are only examples. Greater or lesser magnitudes may be used for the haptic signals. Different frequencies for the periodic components may be used for different output levels, or a same frequency may be used for all output levels. The chime, audio, or visual messages may be omitted. The vehicle controls for output levels four and five may be omitted. The process 600 then continues in a block 645.

In the block 645, the computer 105 increments the number "n," to track the number of outputs implemented during the output sequence. The process 600 then continues in the block 630.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

The computer 105 and the generally include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 800, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A computer in a vehicle comprising a processor and a memory, the memory storing instructions executable by the processor such that the processor is programmed to:
   upon detecting an occupant alertness level below a first threshold, apply a first periodic component to a first torque applied to one or more first-end wheels on the vehicle and a second periodic component to a second torque applied to one or more second-end wheels on the vehicle; and
   establish a first magnitude of the first periodic component and a second magnitude of the second periodic component based on at least one of a coefficient of static friction of a road on which the vehicle is travelling or a change in torque that causes one of the wheels of the vehicle to slip.

2. The computer of claim 1, wherein applying the second torque includes further programming to synchronize the first periodic component to the second periodic component.

3. The computer of claim 2, wherein:
   synchronizing includes programming to apply the second periodic component such that a second polarity of the second periodic component is opposite a first polarity of the first periodic component.

4. The computer of claim 2, wherein:
   applying the second periodic component includes programming to establish the second magnitude of the second periodic component to be substantially equal to the first magnitude of the first periodic component.

5. The computer of claim 1, wherein the processor is further programmed to:
   establish the first magnitude of the first periodic component further based on the occupant alertness level.

6. The computer of claim 1, wherein the processor is further programmed to:
   establish a frequency of the first periodic component based on at least one of:
   a speed of the vehicle; and
   the coefficient of static friction between the vehicle and the road on which the vehicle is travelling.

7. The computer of claim 1, wherein the first periodic component is sinusoidal.

8. The computer of claim 1, wherein a frequency of the first periodic component is in a range between one cycle per second and 20 cycles per second.

9. The computer of claim 1, wherein applying the first and second periodic components includes programming to apply the first and second periodic components for a first duration.

10. The computer of claim 9, wherein the processor is further programmed to:
    upon detecting, a first predetermined time after applying the first and second periodic components, a second occupant alertness level below the first threshold, apply a third periodic component to the first torque and a fourth periodic component to the second torque.

11. The computer of claim 10, wherein the processor is further programmed to:
    apply the third periodic component such that a third magnitude of the third periodic component is greater than the first magnitude the first periodic component based on applying the third periodic component within a second predetermined time after applying the first periodic component.

12. A method comprising:
    upon detecting an occupant alertness level below a first threshold:
      applying a first periodic component to first torque applied to one or more first-end wheels on a vehicle; and
    applying a second periodic component to a second torque applied to one or more second-end wheels on the vehicle; and
      establishing a first magnitude of the first periodic component and a second magnitude of the second periodic component based on at least one of a coefficient of static friction of a road on which the vehicle is travelling or a change in torque that causes one of the wheels of the vehicle to slip.

13. The method of claim 12, wherein:
    applying the second periodic component to the second torque includes synchronizing the second periodic component with the first periodic component, such that a second polarity of the second periodic component is opposite a first polarity of the first periodic component.

14. The method of claim 13, wherein:
    applying the second periodic component includes establishing the second magnitude of the second periodic component to be substantially equal to the first magnitude of the first periodic component.

15. The method of claim 12, further comprising:
    establishing the first magnitude of the first periodic component further based on the occupant alertness level.

16. A computer in a vehicle comprising a processor and a memory, the memory storing instructions executable by the processor such that the processor is programmed to:
    upon detecting an occupant alertness level below a first threshold, apply a first periodic component to a first torque applied to one or more first-end wheels on the vehicle and a second periodic component to a second torque applied to one or more second-end wheels on the vehicle for an application time period, wherein the first polarity of the first periodic component of the first torque is opposite the second polarity of the second periodic component of the second torque at one or more times during the application time period.

17. The computer of claim 16, wherein applying the second torque includes further programming to synchronize the first periodic component to the second periodic component.

18. The computer of claim 17, wherein:
    applying the second periodic component includes programming to establish a second magnitude of the second periodic component to be substantially equal to a first magnitude of the first periodic component.

19. The computer of claim 16, wherein the processor is further programmed to:
    establish a magnitude of the first periodic component based on at least one of:
    the occupant alertness level; and
    a coefficient of static friction of a road on which the vehicle is travelling.

20. The computer of claim 1, wherein the processor is further programmed to:
    establish a frequency of the first periodic component based on at least one of:
    a speed of the vehicle; and
    a coefficient of static friction between the vehicle and a road on which the vehicle is travelling.

* * * * *